United States Patent
Cooper et al.

(10) Patent No.: US 6,521,208 B1
(45) Date of Patent: Feb. 18, 2003

(54) PROCESS FOR PREPARING A MODIFIED ZEOLITE

(75) Inventors: David A. Cooper, Morrisville, PA (US); William E. Cormier, Lansdale, PA (US); Elliot P. Hertzenberg, Wilmington, DE (US); Richard J. Hinchey, Blue Bell, PA (US); Bonita K. Marcus, Radnor, PA (US)

(73) Assignee: PQ Corporation, Valley Forge, PA (US)

( * ) Notice: Subject to any disclaimer, the term of this patent is extended or adjusted under 35 U.S.C. 154(b) by 0 days.

(21) Appl. No.: 09/673,286

(22) PCT Filed: Mar. 3, 2000

(86) PCT No.: PCT/US00/05769

§ 371 (c)(1),
(2), (4) Date: Dec. 19, 2000

(87) PCT Pub. No.: WO00/51940

PCT Pub. Date: Sep. 8, 2000

Related U.S. Application Data

(60) Provisional application No. 60/122,697, filed on Mar. 3, 1999.

(51) Int. Cl.$^7$ .............................. C01B 39/24; B01J 29/08
(52) U.S. Cl. ............................... 423/713; 423/DIG. 21; 502/79; 502/85; 502/86
(58) Field of Search ........................ 423/713, DIG. 21; 502/79, 85, 86

(56) References Cited

U.S. PATENT DOCUMENTS

| | | | |
|---|---|---|---|
| 3,929,672 A | * 12/1975 | Ward | ............................. 502/66 |
| 4,297,335 A | 10/1981 | Lok et al. | |
| 4,401,556 A | 8/1983 | Bezman et al. | |
| 5,013,700 A | 5/1991 | Falth | |
| 5,059,567 A | 10/1991 | Linsten et al. | |
| 5,316,993 A | 5/1994 | Sextl et al. | |
| 5,576,258 A | * 11/1996 | Chamberlain et al. | ......... 502/73 |
| 6,399,530 B1 | * 6/2002 | Chen et al. | ................... 502/64 |

FOREIGN PATENT DOCUMENTS

| | | | |
|---|---|---|---|
| EP | 0 091 076 | | 10/1983 |
| EP | 130368 A | * | 1/1985 |
| EP | 0 356 560 | | 3/1990 |
| GB | 2 014 970 | | 9/1979 |

OTHER PUBLICATIONS

Macedo et al., "Characterization of the Acidity of Highly Dealuminated Y Zeolites," Studies in Surface Science and Catalysis, vol. 37, pp 375–383, 1988.*

Anderson, Michael W. et al.; Zeolites Treated With Silicon Tetrachloride Vapour, *Journal of the Chemical Society, Faraday Transactions I*, Part 5, May 1986, 82, p. 1449.

Jacquinot, E. et al.; Catalytic Properties in Cyclohexene Transformation of Modified HY Zeolites, *Applied Catalysis*, 60, 1990, pp. 101–117.

Janin, A. et al.; FT–IR Study of the Brönsted Acid Sites in Dealuminated HY Zeolites Using Specific Probe Molecules, Perspectives in Molecular Sieve Science, *American Chemical Society Symposium Series 368*, Chapter 7, 1988, p. 117.

Macedo, A.; Strong Acid Sites of Dealuminated Y Zeolites Prepared by Conventional Treatments and Isomorphous Substitution, Perspectives in Molecular Sieve Science, *American Chemical Society Symposium Series 368*, Chapter 6, 1988, p. 98.

Scherzer, Julius; The Preparation and Characterization of Aluminum–Deficient Zeolites,*American Chemical Society Symposium Series 248*, Chapter 10, Catalytic Materials: Relationship Between Structure and Reactivity, 1984, p. 157.

Weitkamp, J. et al; The Hydrophobicity Index– A Valuable Test for Probing the Surface Properties of ZeoliticAdsorbents or Catalysts, *Proceedings of the 9th International Zeolite Conference*, Montreal, 1992, p. 79.

* cited by examiner

*Primary Examiner*—David Sample

(57) ABSTRACT

A hydrophobic zeolite is prepared having high Hydrophobicity Index number by calcining a zeolite with steam under turbulent condition with respect to flow pattern of the zeolite and at a temperature within the range of 650–1000° C.

28 Claims, No Drawings

PROCESS FOR PREPARING A MODIFIED ZEOLITE

This application claims the benefit of U.S. Provisional Application No. 60/122,697, filed Mar. 3, 1999, the entire disclosure of which is hereby incorporated by reference.

FIELD OF INVENTION

This invention relates to zeolites that are useful as adsorbents or catalyst supports. In particular, it involves production of a hydrophobic zeolite.

BACKGROUND OF THE INVENTION

Most zeolites are hydrophilic (water attracting) and thus have higher preference for sorption of water than for organic materials. However, the highly siliceous zeolites tend to be hydrophobic (organic-attracting). Hydrophobic zeolites are useful in selected applications such as removal of volatile organic compounds from water-containing environments.

Hydrophobic zeolites tend to have a relatively small number of catalytically active acid sites. These low acidity zeolites are sometimes useful in catalytic processes where cracking reactions must be minimal.

In order to measure the hydrophobicity of a zeolite, we have developed a Hydrophobicity Index screening test. A Hydrophobicity Index (H) is calculated from the ratio of mass sorption of organic compound to mass sorption of water at specific partial pressures for the two adsorbates; thus $H_c=S_c/S_w$ for cyclohexane over water and $H_n=S_n/S_w$ for n-hexane over water. Highly hydrophilic zeolites will have H values of less than 1.0. Highly hydrophobic zeolites will have H values of substantially greater than 1.0. Selection of the adsorbent depends upon the pore opening of the zeolite structure of interest. It is well known that zeolites with 10-membered or less metal atoms ring openings will not adsorb substantial amounts of cyclohexane. For these zeolites, e.g. ZSM-5, ZSM-11, etc., n-hexane is much more efficacious choice for the organic adsorbent. Moreover, the partial pressure at which the adsorbtion is measured can have an effect on the absolute amount of adsorption of any component and also the hydrophobicity index value. For the purpose of defining the conditions at which the index is measured (the adsorbate and the partial pressures) we have adopted the following convention: $H_{co7/o5}$ refers to an index where cyclohexane adsorption at 7 torr is referenced to water adsorption at 5 torr. Similarly, $H_{no7/o5}$ refers to an index where n-hexane adsorption at 7 torr is referenced to water adsorption at 5 torr.

SUMMARY OF THE INVENTION

A hydrophobic zeolite can be prepared by calcining a precursor zeolite with silica to alumina molar ratio at least 20, under high temperature and the presence of steam and under turbulent conditions with respect to flow pattern of the zeolite. In particular, a novel hydrophobic zeolite Y is provided by this method having a Hydrophobicity Index ($H_{co7/o5}$) of greater than 20.

DETAILED DESCRIPTION OF THE INVENTION

We have found that by calcining zeolites under a turbulent condition, high temperature and in the presence of steam, a hydrophobic zeolite can be prepared. Turbulent condition arises from intimate admixture of the solid and the gas phase such that the characteristic flow pattern of the solid can be considered turbulent. These zeolites are more hydrophobic than zeolites that can be prepared by steam calcining a zeolite under non-turbolent conditions. Examples of hydrophobic zeolites that can be prepared by this method include, for example, zeolite Y, and zeolite beta. These zeolites are considered to have interconnecting pores of at least two-dimensions, preferably interconnecting two or three-dimensions, more preferably three-dimensions. The precursor (starting material) zeolites useful in preparing the hydrophobic zeolites have a silica to alumina molar ratio of at least 20, preferably from about 25, to about 150. The calcination temperature is in the range of from about 650° C., preferably from about 700° C., to 1000° C., preferably to 850° C. in the presence of steam. The steam is preferably present in an amount of at least 10% by volume.

In particular, we have found that by preparing the zeolite by calcining a zeolite having silica to alumina greater than 20, particularly stabilized zeolite Y under a turbulent condition, high temperature and in the presence of steam, a hydrophobic zeolite, particularly a stabilized zeolite Y having a Hydrophobicity Index ($H_{co7/o5}$) of greater than 20, preferably at least 25, can be prepared.

The very hydrophobic zeolite products of our invention are prepared from zeolites having the structure of zeolite Y that is stabilized. These very hydrophobic zeolites have Hydrophobicity Index ($H_{co7/o5}$) of greater than 25, preferably greater than 30: The ultrahydrophobic materials have a Hydrophobicity Index ($H_{co7/o5}$) of greater than 30, preferably equal to or greater than about 35.

It has been surprisingly found that a very hydrophobic zeolite Y material can be prepared from a precursor material with a moderate silica to alumina molar ratio (bulk silica to alumina ratio) in the range of from 25, preferably from about 40, to about 150, preferably to about 120.

It has also been surprisingly found that an ultrahydrophobic zeolite Y material can be prepared from a precursor having silica to alumina molar ratio of greater than about 60, preferably greater than about 75, preferably greater than about 85.

The hydrophobic zeolite Y material of the invention can be produced by calcining a stabilized Y zeolite having a unit cell size within the range of less than 24.40 preferably less than 24.35, more preferably less than 24.30, most preferably less than 24.27, to preferably greater than 24.15, under turbulent conditions at a temperature within the range of from about 650° C., preferably from about 700° C., to 1000° C., preferably to 850° C. in the presence of steam. The steam is preferably present in an amount of at least 10% by volume.

Turbulent condition as herein referred to is a condition in which there is sufficient mix between solid phase and gas phase in which the gas flows through the dispersed solid phase without a discernable interface. The condition is not turbulent if the gas phase flows over a stationary solid such that there is a discernable interface between the solid and the gas.

While not wishing to be bound by theory, we believe that superior contacting of the solid involved with the reactive gas atmosphere directly leads to the high hydrophobicity characteristic of the present invention. We believe that this condition is met when a substantial portion of the solid particles are continuously and completely surrounded by the reactive gas mixture. This condition can be described as a flow rate such that a significant fraction of the solid articles have reached the point where they have at least just been suspended and set in motion by the action of the gas. Such a velocity has often been described as the minimum fluidization velocity. This often occurs at Reynolds numbers ($N_{Re}$) less than about 10 ($D_p G_{mf}/\mu$). This phenomenom has been described by the following relationship (Leva, "Fluidization," p. 63, McGraw-Hill, New York 1959):

$$G_{mf} = \frac{0.0005 D_p^2 g_c \rho_f (\rho_s - \rho_f) \phi_s^2 \epsilon_{mf}^3}{\mu(1 - \epsilon_{mf})}$$

where
- $G_{mf}$=fluid superficial mass velocity for minimum fluidization, lb./(sec.)(sq.ft.)
- $D_p$=particle diameter, ft.
- $g_c$=dimensional constant, 32.17 (lb.)(ft.)/(lb.force)(sec.$^2$)
- $\rho_f$=fluid density, lb./cu.ft.
- $\rho_s$=solids density, lb./cu.ft.
- $\Phi_s$=particle shape factor, dimensionless
- $\epsilon_{mf}$=voidage at minimum fluidization, dimensionless
- $\mu$=fluid viscosity, lb./(ft.)(sec.)

Alternately, this has been described by a similar equation (Perry, "Chemical Engineers' Handbook," 4th Edition, p. 4–25, McGraw-Hill, New York):

$$G_{mf} = \frac{5.23 \times 10^5 D_p^2 \rho_f^{1.1} (\rho_s - \rho_f)}{\mu}$$

where
- $G_{mf}$=fluid superficial mass velocity for minimum fluidization, lb./(hr.)(sq.ft.)
- $D_p$=particle diameter, ft.
- $\rho_f$=fluid density, lb./cu.ft.
- $\rho_s$=solids density, lb./cu.ft.
- $\mu$=fluid viscosity, lb./(ft.)(sec.)

For the invention process, it is preferable to calcine under a minimum fluidization velocity through at least substantial portion of zeolite particles in contact with gas phase where flow rate has a Reynolds number of at least 5, preferably at least 10. Substantial portion of zeolite particles are in contact with the gas phase when at least 50%, preferably 85%, more preferably 95%, most preferably 100% of the zeolite particles are in contact with the gas phase.

To produce a turbulent condition, for example, a fluidized bed calciner or ebulating bed calciner, such as those available from such companies as Procedyne (New Brunswick, N.J.) and A. J. Sackett & Sons (Baltimore, Md.), and others can be used. This is not meant to be an exhaustive list of equipment but only to provide description of the types of equipment that are suitable for the process described.

The equipment should be operated with sufficient flow of gas phase to produce turbulence in the solid and at a temperature and steam partial pressure effective to produce a hydrophobic zeolite of the invention.

The starting stabilized zeolite Y can be prepared from zeolite NaY. Zeolite NaY can be produced by any conventional manner from water, a source of alumina, a source of silica, and sodium hydroxide. The resulting NaY zeolite has silica to alumina molar in the range of 4.0 to 6.0. Stabilization of this material is accomplished by combination ion exchange and steam calcination with at least one step of each. One way to prepare such zeolite is described in U.S. Pat. No. 5,059,567 which disclosure is hereby incorporated by reference and another in U.S Pat. No. 4,477,336, which disclosure is also incorporated by reference. In one method to prepare the starting material, the NaY can be ion-exchanged with ammonium solution, such as ammonium sulfate one or more times, washed and dried. The ammonium ion-exchanged zeolite can be calcined at a temperature in the range of 550° C. to 800° C. in the presence of steam. This zeolite is then further ion exchanged with an ammonium solution and then recalcined in a similar temperature range. Following this calcination, the resultant zeolite is dealuminated by contact with mineral acid under conditions such that the desired silica to alumina molar ratio is achieved.

The novel hydrophobic zeolite Y of the invention has a unit cell size in the range of from 24.15, preferably from 24.20, to 24.35, preferably to 24.28 angstrom. The surface area of these novel hydrophobic zeolite Y materials is preferably at least 500, more preferably at least 600 square meters per gram. The silica to alumina (chemical) molar ratio is substantially unchanged from the stabilized precursor zeolite. Organic adsorption is at least 10% by weight at a pressure of 7 torr.

Without wishing to be bound by any particular theory we speculate that the exceptionally high degree of hydrophobicity obtained in zeolite materials by the process of this invention may be due to the changed nature of the interaction between the zeolite solids and the reactive gas atmosphere. In the turbulent fluid bed the degree of intimacy of contact between all solid particles and the hydrothermally reactive gas phase is much greater than can be effected in a static bed or in the mildly roiled bed of powder found in a rotary kiln. The typical rotary kiln is operated as a continuous process with a constant feed of powder entering one end of a heated tube and a constant flow of processed material discharged from the other. The steam or air/steam mixture used in a counter-current flow to treat the zeolite powder, according to the teachings of prior art, largely passes over the bed of solids making its most effective contact only with the solids exposed at the bed surface by the slow turnover with rotation of the calciner tube. In such equipment excessive turbulence must normally be prevented so as to avoid entrainment of solids in the gas phase and loss of material from the kiln.

It is known that the combination of water and high temperature promotes the hydrolysis of framework Al out of the zeolite structure thus eliminating framework charge centers according to the following reaction:

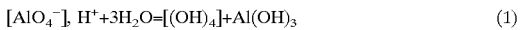

$[AlO_4^-], H^+ + 3H_2O = [(OH)_4] + Al(OH)_3$    (1)

where $[AlO_4^-]$ indicates the anionic charge center in the tetrahedral framework lattice and $[(OH)_4]$ indicates the "hydroxy-nest" framework vacancy created by hydrolysis to generate non-framework $Al(OH)_3$ and related species. The —OH groups in the vacancy are attached to Si atoms in the lattice. This treatment removes sites at which polar water molecules can be held by ion dipole interaction.

Water can also be bound to the solid by interaction with residual hydroxyl groups (—OH) by H-bonding. Thermal treatment alone eliminates most hydroxyl groups in zeolite materials at temperatures between 500–650° C. as indicated by TGA analysis. The hydroxyl elimination reaction can be written in simplest form as:

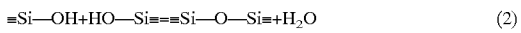

$\equiv Si—OH + HO—Si \equiv = \equiv Si—O—Si \equiv + H_2O$    (2)

However, we have discovered that this reaction is not sufficient to substantially complete the elimination of hydrophyllic centers for zeolites. We have discovered surprisingly that contacting the zeolite with steam under turbulent conditions, at temperature of above 650° C. with steam produces zeolites that are highly hydrophobic. We now speculate that the forced elimination of hydroxyl groups at high temperature can generate significant strain in the siloxane bonds thus formed.

Framework vacancies are especially susceptible to the formation of strain centers. Such strained bonds possess varying degrees of partial polarization and this residual polarity provides sites for sorption of water and reversal of reaction (2) when the zeolite material is exposed to aqueous vapor again under milder thermal conditions. To minimize such polarized strain sites within the zeolite structure it is necessary to promote the release of strain to a substantial degree by a time dependent annealing process. The annealing mechanism may involve a continuous and reversible breaking and forming of bonds allowing the whole crystal structure to undergo a progressive relaxation towards minimized residual strain. This mechanism is most effectively catalyzed by the well known "mineralizing action" of water vapor.

Hydrothermal treatment of zeolite materials in a turbulent fluidized bed without tangibly identifiable phase boundaries appears to drive the hydrophobization process in zeolite materials to a degree that has not been recognized previously and which is not attainable by treatment of non-fluidized material for comparable times under equivalent hydrothermal conditions. Since we believe that the optimum annealing process involves a uniform minimization of residual strain energy throughout the structure of each crystal there is reason to suppose that the mechanism will be most effective for treatments that expose zeolite particles and particularly crystals to uniform conditions of heat transfer and contact with water vapor that is independent of any direction in space due to equipment or powder bed configuration. While it would not be surprising to find differences in the response of different crystal structures to this isotropic environmental condition we believe the treatment given to zeolites by the process of this invention is expected in every case to move the material in the direction of enhanced hydrophobicity. These novel zeolites can be useful as adsorbent for organics.

EXAMPLES

The following examples illustrate certain embodiments of our invention. These examples are not provided to establish the scope of the invention, which is described in the disclosure and recited in the claims. The proportions are in parts by weight (pbw), percent by weight, moles or equivalents.

X-Ray Diffraction

The x-ray diffraction patterns of the Y zeolites prepared in the examples were determined. Relative crystallinity was determined by ASTM test method, D3906-97, standard test method for determination of relative X-ray diffraction intensities of faujasite-type zeolite-containing materials. The lattice constants were determined by ASTM method, D3942-97, standard test method for determination of unit cell dimension of a faujacite-type zeolite. The sharp peaks of the XRD spectra of zeolite Y prepared by our method also indicates their good crystallinity and lack of defects or amorphous material.

Surface Area

The surface areas of the zeolite samples were determined by the ASTM test method (D3663-92). This method utilizes a modification of the gas adsorption technique of surface area measurement described by Brunauer, Emmett and Teller, (BET). Zeolite were calcined in air at 500° C. for a period of 4 hours and then degassed by heating in vacuum at 350° C. to remove sorbed vapors. The samples were then cooled to liquid nitrogen temperature. The quantity of nitrogen adsorbed at low pressure is determined by measuring the pressure difference after the introduction of a fixed volume of nitrogen to the sample. Under these conditions, nitrogen is sorbed into zeolite micropores. The volumetric sorption measurement is measured at pressure levels of P/Po between 0.02 and 0.05. The magnitude of the nitrogen sorbed is calculated using the BET equation.

Mass Sorption

Mass sorption of water and the organics (cyclohexane or n-hexane) were measured using an RXM-100 Multifunctional Catalyst Testing & Characterization Machine from Advanced Scientific Design, Inc. For the water sorption test, approximately 20 mg of zeolite samples were used. Zeolites were well dried prior to measurement. Samples were pretreated by heating the sample from 20° C. to 500° C. at 20° C./min under rough vacuum and held at 500° C. for 1 hour under high vacuum. The reactor containing the sample is maintained at 25° C. using a water bath. The total water adsorption is measured first by introducing water vapor at an initial pressure resulting in the desired final pressure after 5 minutes adsorption. To obtain a full isotherm 10 to 12 final pressure points are measured at final pressures between 0.5 and 12 torr with the last point being approximately 12 torr. In order to correct for the condensation of water vapor on the walls, an empty reactor was run similarly and subtracted from the test results to obtain net adsorption.

For the organic sorption tests, approximately 100 mg of zeolite samples were used. Zeolites were well dried prior to measurement. Samples were pretreated by heating the sample for 20° C. to 500° C. at 20° C./min under rough vacuum and held at 500° C. for 1 hour under high vacuum. The reactor containing the sample is maintained at 25° C. using a water bath. The total organic adsorption is measured first by introducing organic vapor at an initial pressure resulting in the desired final pressure after 3 minutes adsorption. To obtain a full isotherm 6 to 8 final pressure points are measured at final pressures between 0.5 and 45 torr with the last point being approximately 45 torr.

Chemis Analysis v 5.04 program was used to generate the isotherm.

The data used for calculation of the hydrophobicity index were chosen at 5 torr for water and 7 torr for cyclohexane to ensure values were at monolayer coverage.

An alternative method was used for measurement of some of the samples, using a Landolt type sorption apparatus. (Landolt, George R., Analytical Chemistry, 43, 613 (1971).) The samples were pretreated by heating the sample in a vented muffle furnace with 3° C./min. ramp and held at 520° C. for 4 hours. The cyclohexane sorption measurements were done at 40 mm (torr) pressure at ambient temperature (21–25° C). Sorption was measured by mass difference after equilibrium has reached (typically after about 20 minutes). The water sorption measurements were done at 11 torr pressure at ambient temperature or in a constant humidity desiccator containing a saturated solution of magnesium nitrate.

A correlation to convert the data generated by the alternative method to the pressure points used for the RXM-100 method was derived empirically from data generated from the RXM method at multiple pressure points.

Methanol Adsorption

Methanol adsorption measurements were measured using an RXM-100 Multifunctional Catalyst Testing & Characterization Machine from Advanced Scientific Design, Inc.

80 to 100 mg of zeolite samples were used. Zeolites were well dried prior to measurement. Samples were pretreated by heating the sample for 20° C. to 500° C. at 20° C./min under rough vacuum and held at 500° C. for 1 hour under high vacuum in a BET reactor. The reactor containing the sample is maintained at 25° C. using a water bath.

Methanol vapor is introduced at about 40 torr and the pressure is recorded initially and after stabilization reading 3 to 5 minutes interval. This step is repeated until the desired final pressure is reached.

Chemis Analysis v 5.04 program was used to generate the isotherm.

Base Titration

Approximately 10 grams of zeolite (100 mL $H_2O$) was titrated using aqueous 1M $NH_4OH$ solution to a final pH of approximately 9±0.01.

pH Treatment

NH$_4$OH solution was used to treat zeolite to an appropriate pH level for sufficient time to achieve a stable pH.

Calcination Method 1

This is the process of the invention. Zeolite was introduced to a conical shape fluid bed design calciner (FBC), and heated to a temperature of 1380–1420° F. (750–770° C.) under fluidizing conditions using a steam/air mixture and held at the temperature for specified typical time intervals from 30 minutes to 4 hours. The steam/air fluidizing mixture is in the approximate range of 60/40 to 80/20. Steam flow is then discontinued and the fluidization medium is switched to air alone. The product is then transferred to a cooler with air alone over about 30 minutes time.

Calcination Method 2

This is a comparative process using a rotary calciner where the calcination occurred without turbulence. 15 pounds of zeolite is loaded into a 55" long by 15" long diameter drum that contains two 1" baffles located opposite each other. The calciner with the drum is heated to about 750° F. while the drum is rotated at 6 RPM. The typical heat up time is 3 hours. 100% steam is maintained by injecting 18 mls/minute H$_2$O and no air into the rotating drum. The steam contact time is 1–2 hours. Steam and/or air was injected above the bed of zeolite powder such that there was a discernible interface between the gas phase and the solid phase.

Calcination Method 3

This is a comparative process under fixed bed condition. The system consist of an alloy vessel (sample chamber) contained within a top-vented muffle furnace to which air and steam is supplied. The furnace is heated from 110° C. to 760° C. The vessel is supplied with steam varying in water content (air/water), made from a steam generator with temperatures ranging from 400° C.–450° C. Steam is added to the sample chamber at about 250° C. The airflow is at 500 ml/min. The volume percent of steam is regulated by the flow of liquid water to the steam generator. The furnace is heated to the desired calcination temperature. Steam is forced through the sample by the design of sample holder and chamber. The sample holder is an open 10 cm diameter steel cylinder with 1.4 cm height that can hold approximately 15–25 grams of zeolite. The zeolite is supported on a bed of quartz mat fiber on top of the perforated steel bottom sample holder that allows steam to flow uniformly through the sample.

Starting Stabilized Zeolite Y Material A

A similar process to Example 1 of U.S. Pat. No. 5,059,567 was used, except ammonium chloride was used instead of ammonium sulfate. H$_{co7/o5}$ of this zeolite material A is approximately 6–8. The properties of the precursor zeolites are given in Table 1 below. Lattice constant of A was 24.24.

Starting Stabilized Zeolite Y Material B

A similar process to starting material A was used, except the aluminum sulfate exchange step was eliminated. H$_{co7/o5}$ of this zeolite material B is approximately 7–9. The properties of the precursor zeolites are given in Table 1 below. Lattice constant of B was 24.25–24.26.

Examples 1–14

These examples illustrate the preparation of the hydrophobic zeolite Y of the invention. Starting material zeolites A or B described above were calcined under various conditions as listed in Table 1 below. Calcination Method 1 was used to calcine these material to produce products of this invention. Product properties are listed in Tables 1-2, 4-5 below.

Comparative Example A

This is a comparative example where starting material B was calcined using Calcination Method 2. Properties of the starting material, process conditions and product properties are listed in Tables 3, 4 and 5 below.

Comparative Example B

This is a comparative example where starting material A or B were calcined using Calcination Method 3. Properties of the starting material, process conditions and product properties are listed in Tables 3, 4 and 5 below.

Comparative Example C

This is a comparative example where the Hydrophobicity Index of a commercially available zeolite Y having a silica to alumina molar ratio of 200, HSZ-390HUA, from Tosoh Corporation was measured. The result is listed in Table 3.

Example 15

Adsorption of Methanol on Hydrophobic Zeolite Y of the Invention

The physisorption of methanol (MetOH) on the hydrophobic zeolite Y of the invention of Example 3 resulted in unusual adsorption isotherms at temperatures from 0 to 60° C. These Type 5 or Type 6 isotherms showed a sharp adsorption step near p/p$_o$~0.2 which is markedly different from the Type 1 adsorption isotherms usually observed on microporous materials and also from the Type 3 isotherms typical for the adsorption of alcohols or water on most hydrophobic surfaces. Except one paper, U. Müller, K. K. Unger, *Characterization of Porous Solids* (Ed. by K. K. Unger et al., Elsevier, Amsterdam) 101 (1988), that describes the adsorption of N$_2$ on ZSM5 at around 77K, we have not found any report in the open literature that describes a sharp adsorption step near p/p$_o$~0.2 for any adsorbate on microporous silicates or aluminosilicates (zeolites). As Table 6 indicates the adsorption of MetOH gives a Type 1 adsorption isotherm on starting stabilized zeolite Y material A which is a parent compound of hydrophobic zeolite Y. Acetone, H$_2$O and cyclohexane have also Type 1 isotherms on the hydrophobic zeolite Y of the invention. The adsorption isotherms are grouped into classes originally proposed by Brunauer, Deming, Deming, and Teller, (BDDT), (1) S. Brunauer, L. S. Deming, W. S. Deming, E. Teller, *Journal of American Chemical Society*, 62, p. 1723 (1940), sometimes referred to as Brunauer, Emmett, and Teller (BET), (2) S. Brunauer, P. H. Emmett, E. Teller, *Journal of American Chemical Society*, 60, p. 309 (1938),or similarly Brunauer, (3) S. Brunauer, The Adsorption of Gases and Vapours, Oxford University Press (1945), and further described by Gregg and Sing (4) S. J. Gregg, K. S. W. Sing, Adsorption, Surface Area and Porosity, 2nd Edition, Academic Press, Inc. (1982) Chapter 1.

Molecular modeling results indicate that the odd shape of the MetOH adsorption isotherms on the hydrophobic zeolite Y of the invention can be directly related to the specific structure of dealuminated Y zeolite. The visualization of the adsorption process on the aluminum free Y zeolite suggests that only a small number of MetOH molecules can accumulate in the bent corners of the supercages at MetOH vapor pressures p/p$_o$<0.1. This is understandable when one considers that the sorbate-surface attraction forces are weak, but the force field around the methanol molecules is strongest in the curved corners of supercages near the entrance of the cuboctahedral units. Apparently, the concentration of MetOH is enough for a substantial sorbate-sorbate interaction at p/p$_o$~0.1, where the condensation like process takes place within the micropores that results in filling up the zeolite pores by methanol. Once this happens only a small part of the crystal lattice remains unfilled thus the adsorbed amount of methanol will only slightly increase when the vapor pressure is increased to p/p$_o$>0.1.

These hydrophobic zeolite Y of the invention are useful as adsorbents for polar hydrocarbon materials, particularly alcohol.

TABLE 1

| Example No. | Starting Zeolite | Na$_2$O | SAR | Surface Area | Hydrophobicity Hc | H$_2$O (5 Torr) | Cyclohexane (7 Torr) | X'tal | Lattice Constant | Time, hrs @ temp |
|---|---|---|---|---|---|---|---|---|---|---|
| 5 | A | 0.03 | 83 | 794 | 32 | 0.46 | 14.76 | 112 | 24.20 | 2 |
| 6 | A | 0.02 | 83 | 742 | 29 | 0.49 | 14.07 | 112 | 24.24 | 2 |
| 7 | A | 0.01 | 86 | 755 | 27 | 0.54 | 14.35 | 113 | 24.23 | 2 |
| 8 | A | 0.01 | 80 | 765 | 24 | 0.61 | 14.47 | 117 | 24.22 | 1 |
| 9 | A | 0.02 | 87 | 776 | 25 | 0.59 | 14.79 | 125 | 24.33 | 1 |
| 10 | A | 0.02 | 85 | 694 | 25 | 0.59 | 14.97 | 125 | 24.34 | 1 |
| 11 | A | 0.02 | 91 | 726 | 23 | 0.65 | 15.24 | 124 | 24.25 | 1 |
| Average | | 0.02 | 85 | 750 | 26 | 0.56 | 14.66 | 118 | 24.26 | |
| 1 | B | 0.05 | 76 | 791 | 34 | 0.44 | 15.02 | 112 | 24.26 | 2 |
| 2 | B | 0.04 | 78 | 699 | 32 | 0.48 | 15.14 | 104 | 24.27 | 2 |
| 3 | B | 0.03 | 83 | 782 | 40 | 0.38 | 15.10 | 110 | 24.26 | 4 |
| 4 | B | 0.03 | 85 | — | 39 | 0.39 | 15.13 | 113 | 24.24 | 4 |
| 12 | B | 0.03 | 79 | 790 | 29 | 0.52 | 15.17 | 110 | 24.25 | 1 |
| 13 | B | 0.03 | 82 | 806 | 30 | 0.50 | 15.23 | 108 | 24.26 | 0.5 |
| 14 | B | 0.06 | 81 | 797 | 37 | 0.41 | 15.13 | 135 | 24.25 | 1 |
| Average | | 0.04 | 81 | 778 | 34 | 0.45 | 15.13 | 113 | 24.26 | |

TABLE 2

Methanol Adsorption Data

| Example No. Temperature (° C.) | No. 3 30 Torr | No. 3 60 Torr | No. 3 80 torr |
|---|---|---|---|
| 25 | 17 | 18.9 | 20.2 |
| 35 | 7.4 | 17.1 | 18 |
| 45 | 2 | 13.4 | 15.8 |
| 50 | 1.6 | 5 | 13.9 |
| 55 | 1.3 | 2.7 | 6.5 |
| 60 | 1.1 | 2 | 3.2 |
| 65 | 1 | 1.7 | 2.2 |

TABLE 3

| Comp. Example No. | Starting Zeolite | Starting Hc$_{07/05}$[1] | SAR | Surface Area (m$^2$/g) | T (° C.) | p (H$_2$O) % | Time (hrs) | Hc$_{07/05}$[1] |
|---|---|---|---|---|---|---|---|---|
| A-1 | B | 8 | 80 | 797 | 750 | 100 | 1 | 18[2] |
| A-2 | B | 6 | 80 | 822 | 750 | 100 | 1 | 16[2] |
| B-1 | A | 5 | 65 | 828 | 760 | 100 | 1 | 11 |
| B-2 | A | 5 | 65 | 828 | 760 | 80 | 2 | 11 |
| B-3 | B | 6 | 70 | 785 | 760 | 100 | 1 | 13 |
| B-4 | B | 6 | 70 | 785 | 760 | 80 | 2 | 13 |
| B-5 | B | 9 | 88 | 818 | 760 | 100 | 1 | 22 |
| B-6 | B | 9 | 88 | 818 | 760 | 80 | 2 | 18 |
| C | — | — | 200 | 750 | — | — | — | 23 |

[1]Empirical number generated from Hc$_{40/11}$ measured values.
[2]Measured as Hc$_{07/05}$ values.

TABLE 4

Base Titration Data

| Sample | Starting Zeolite | Comparative Example A-1 | No. 3 | No. 12 |
|---|---|---|---|---|
| Initial pH (average) | 3.74 | 4.30 | 4.90 | 4.21 |
| Titration 1 (mmol/g) | 0.322 | 0.297* | 0.125 | 0.175 |
| Titration 2 (mmol/g) | 0.306 | 0.252 | 0.165* | 0.202 |
| Titration 3 (mmol/g) | 0.314 | 0.245 | 0.146 | 0.183 |
| Average (mmol/g) | 0.314 | 0.249 | 0.136 | 0.187 |

TABLE 4-continued

Base Titration Data

| Sample | Starting Zeolite | Comparative Example A-1 | No. 3 | No. 12 |
|---|---|---|---|---|
| LOI (%) | 12.97 | 2.80 | 1.50 | 2.19 |
| Average (mmol/g anhydr.) | 0.36 | 0.26 | 0.14 | 0.19 |

*Due to slight over titration (pH about 9.08) not counted in average.

TABLE 5 pH Treatment Data

| Starting material | pH Surface area | None 891 | 7.5 877 | 8.0 812 | 9.0 632 |
|---|---|---|---|---|---|
| Comparative Example A-1 | pH Surface area | None 752 | 7.5 733 | 8.0 737 | 9.0 667 |
| Example No. 12 | pH Surface area | None 775 | 7.5 778 | 8.0 718 | 9.0 741 |
| Example No. 3 | pH Surface area | None 781 | 7.5 779 | 8.0 774 | 9.0 735 |

TABLE 6

| Hydrophobic Zeolite of Example 3 at 20° C. final P | Wt. = 0.0727 g Ads. mL stp | Starting Zeolite A at 23° C. final P | Wt. = 0.0624 g Ads. mL stp |
| --- | --- | --- | --- |
| 1.640 | 0.5142 | 0.320 | 0.84 |
| 5.580 | 0.9623 | 1.480 | 1.71 |
| 8.620 | 1.3345 | 2.640 | 2.2 |
| 10.460 | 1.6969 | 5.560 | 3.03 |
| 11.580 | 2.1235 | 9.200 | 3.91 |
| 12.420 | 2.7126 | 12.580 | 4.83 |
| 13.060 | 3.3913 | 15.960 | 5.8 |
| 13.400 | 4.2775 | 20.800 | 6.57 |
| 13.720 | 5.2017 | 30.020 | 7.17 |
| 14.000 | 5.9808 | 37.780 | 7.55 |
| 14.320 | 6.8168 | 42.700 | 7.79 |
| 15.420 | 7.7797 | 47.540 | 8.02 |
| 18.960 | 8.5408 | 54.720 | 8.32 |
| 27.200 | 9.1588 | 61.440 | 8.57 |
| 30.580 | 9.3314 | 67.120 | 8.76 |
| 34.260 | 9.4629 | 75.340 | 8.98 |
| 40.220 | 9.712 | 79.880 | 9.13 |
| 42.740 | 9.8163 | 81.960 | 9.21 |

| p/po | Adsorbed [MetOH g/g] | p/po | Adsorbed [MetOH g/g] |
| --- | --- | --- | --- |
| 0.017 | 0.010 | 0.003 | 0.019 |
| 0.057 | 0.019 | 0.002 | 0.039 |
| 0.089 | 0.026 | 0.004 | 0.050 |
| 0.108 | 0.033 | 0.009 | 0.069 |
| 0.119 | 0.042 | 0.014 | 0.089 |
| 0.128 | 0.053 | 0.020 | 0.111 |
| 0.138 | 0.084 | 0.033 | 0.150 |
| 0.141 | 0.102 | 0.047 | 0.164 |
| 0.144 | 0.117 | 0.059 | 0.173 |
| 0.147 | 0.134 | 0.067 | 0.178 |
| 0.158 | 0.153 | 0.075 | 0.184 |
| 0.195 | 0.168 | 0.086 | 0.190 |
| 0.280 | 0.180 | 0.097 | 0.196 |
| 0.314 | 0.183 | 0.106 | 0.200 |
| 0.352 | 0.186 | 0.118 | 0.205 |
| 0.413 | 0.191 | 0.126 | 0.209 |
| 0.439 | 0.193 | 0.129 | 0.211 |

We claim:

1. A process for preparing a hydrophobic zeolite comprising calcining a zeolite having a silica to alumina molar ratio of at least 20, at a temperature in the range of from about 650° C. to about 1000° C. in the presence of steam and under a turbulent condition with respect to flow pattern of the zeolite for at least 15 minutes thereby producing the hydrophobic zeolite.

2. The process of claim 1 wherein the zeolite has a silica to alumina molar ratio of at least 40.

3. The process of claim 1 wherein steam partial pressure is at least 10 volume percent.

4. The process of claim 1 wherein the zeolite to be calcined is an interconnecting two- or three-dimensional zeolite.

5. The process of claim 4 wherein the zeolite to be calcined is an interconnecting three-dimensional zeolite.

6. The process of claim 5 wherein the zeolite to be calcined is zeolite Y having a unit cell size less than or equal to 24.40 angstrom.

7. The process of claim 6 wherein the zeolite to be calcined is zeolite Y having a unit cell size less than or equal to 24.30 angstrom.

8. The process of claim 1 wherein the zeolite is calcined under a minimum fluidization velocity through at least substantial portion of zeolite particles are in contact with gas phase whose flow rate has a Reynolds number of at least 5.

9. The process of claim 1 wherein the turbulent condition is produced by calcining the zeolite in a fluidized calciner.

10. The process of claim 9 wherein the zeolite to be calcined is an interconnecting three-dimensional zeolite.

11. The process of claim 10 wherein the zeolite to be calcined is a zeolite Y having a unit cell size of less than or equal to 24.40 angstrom.

12. The process of claim 11 wherein the zeolite Y is prepared by ammonium-exchanging a NaY zeolite and dealuminating the ammonium-exchanged Y zeolite.

13. A hydrophobic zeolite Y having a unit cell size in the range of 24.15 to 24.40, silica to alumina molar ratio of greater than 20, and Hydrophobicity Index ($H_{cO7/O5}$) of greater than 30.

14. The hydrophobic zeolite of claim 13 wherein the silica to alumina molar ratio is greater than about 60.

15. The hydrophobic zeolite Y of claim 14 wherein the Hydrophobicity Index ($H_{cO7/O5}$) is greater than 35.

16. The hydrophobic zeolite Y of claim 15 wherein the unit cell size is in the range of 24.15 to 24.35.

17. The hydrophobic zeolite Y of claim 15 wherein the hydrophobic zeolite has a surface area of at least 500 m$^2$/g.

18. The hydrophobic zeolite Y having a unit cell size in the range of 24.15 to 24.40, silica to alumina molar ratio in the range of 30 to 150, and Hydrophobicity Index ($H_{cO7/O5}$) of greater than 25.

19. The hydrophobic zeolite Y of claim 18 wherein the silica to alumina molar ratio is in the range of 40 to 100.

20. The hydrophobic zeolite Y of claim 19 wherein the unit cell size is in the range of 24.15 to 24.35.

21. The hydrophobic zeolite Y of claim 18 wherein the Hydrophobicity Index ($H_{cO7/O5}$) is greater than 30.

22. The hydrophobic zeolite Y of claim 18 wherein the Hydrophobicity Index ($H_{cO7/O5}$) is greater than 35.

23. The hydrophobic zeolite Y of claim 18 wherein the hydrophobic zeolite has a surface area of at least 500 m$^2$/g.

24. The hydrophobic zeolite Y of claim 18 wherein the silica to alumina molar ratio is in the range of 40 to 100.

25. The hydrophobic zeolite Y of claim 22 wherein the silica to alumina molar ratio of in the range of 40 to 100.

26. A hydrophobic zeolite Y having a unit cell size in the range of 24.15 to 24.40, silica to alumina molar ratio of greater than 20, and having a Type 5 or Type 6 isotherm for physisorption of methanol.

27. An adsorbent of polar hydrocarbon material comprising the hydrophobic zeolite Y of claim 26.

28. The adsorbent of claim 27, wherein the polar hydrocarbon material is alcohol.

* * * * *